US006658787B1

(12) United States Patent
Bonnot

(10) Patent No.: US 6,658,787 B1
(45) Date of Patent: Dec. 9, 2003

(54) HUMANE RACCOON RESTRAINT

(76) Inventor: Gary D. Bonnot, Rt. 1, Box 114, Bonnots Mill, MO (US) 65016

( * ) Notice: Subject to any disclaimer, the term of this patent is extended or adjusted under 35 U.S.C. 154(b) by 182 days.

(21) Appl. No.: 09/875,008

(22) Filed: Jun. 7, 2001

(51) Int. Cl.[7] ............................................. A01M 23/00
(52) U.S. Cl. .................................. 43/58; 43/85; 43/87
(58) Field of Search .............................. 43/58, 59, 78, 43/85, 86, 87, 96, 61, 82

(56) References Cited

U.S. PATENT DOCUMENTS

| 1,454,015 | A | * | 5/1923 | Schuetz | 43/96 |
|---|---|---|---|---|---|
| 4,158,929 | A | | 6/1979 | Custard | 43/58 |
| 4,471,560 | A | * | 9/1984 | Hughan | 43/85 |
| 4,483,093 | A | | 11/1984 | Isborn | 43/58 |
| 4,739,578 | A | * | 4/1988 | Pitchford | 43/87 |
| 4,751,790 | A | * | 6/1988 | Thomas | 43/87 |
| 4,802,301 | A | | 2/1989 | Isborn et al. | 43/58 |
| 5,309,667 | A | * | 5/1994 | Ladzinski | 43/87 |
| 5,862,624 | A | | 1/1999 | Askins | 43/61 |
| 5,987,811 | A | * | 11/1999 | Wiesener et al. | 43/58 |

* cited by examiner

*Primary Examiner*—Kurt Rowan
(74) *Attorney, Agent, or Firm*—Patent & Trademark Services; Thomas Zack; Joseph H. McGlynn

(57) ABSTRACT

An animal trap designed to restrain a raccoon. The trap has a spring trigger on which the bait is placed and a double swivel anchor chain to hold the trap. A movable restraint bar actuated by the release of the trigger and an internal fixed grip bar hold the paw of the raccoon inside the housing.

5 Claims, 3 Drawing Sheets

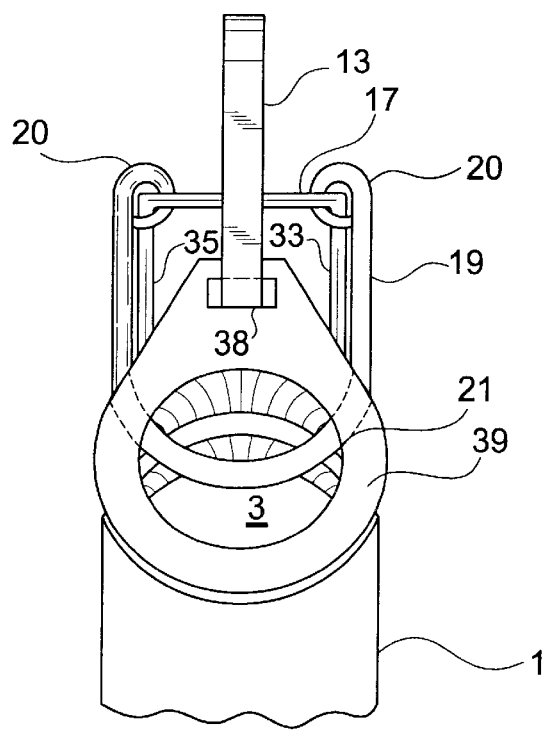
FIG.3
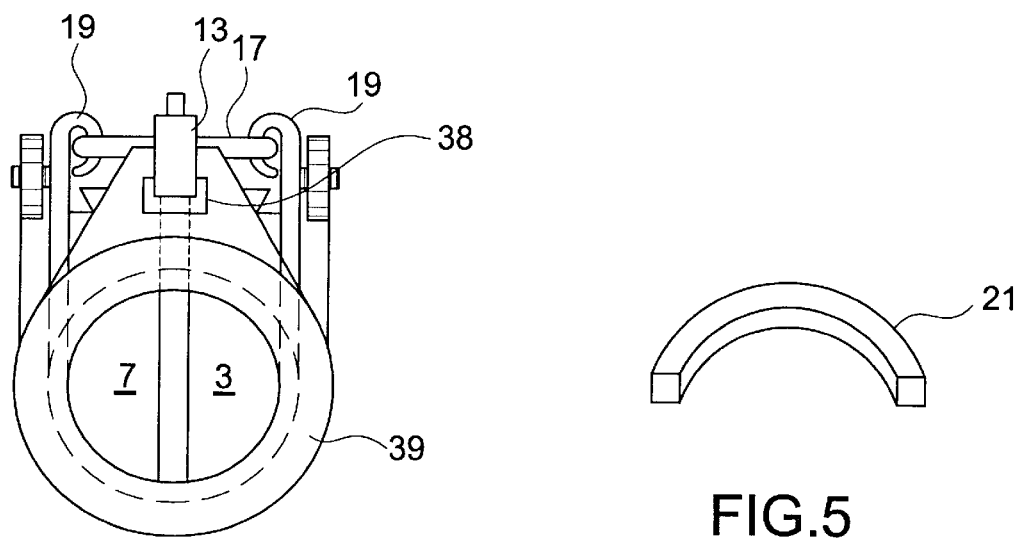
FIG.4
FIG.5

HUMANE RACCOON RESTRAINT

BACKGROUND OF THE INVENTION

This invention relates to an animal trap that is used to trap a raccoon. Various types of traps have been used to restrain the movement of animals and to cause little or no injury to the animal. For example, in one such humane animal trap, a spring biased bait trigger is used. In another earlier trap, a spring biased bait trigger and a restraining chain is disclosed. Another prior art animal trap consists of an enclosure with a small hole to allow access to the bait inside. After the animal lifts the bait, two thick jaws with no sharp edges engage the animal's inserted paw. Still another trap invention utilized a collapsible animal trap with a spring biased trigger mechanism.

DESCRIPTION OF THE PRIOR ART

Animal traps, especially those for small animals like raccoons, have been constructed in a vary of ways. Providing for the humane restraint of the animal is provided for in some of these traps. For example, in the U.S. Pat. No. 4,158,929 to Custard there is disclosed the use of a spring biased bait trigger.

U.S. Pat. No. 4,483,093 to Isborn discloses a trap with a spring biased bait trigger and a restraining chain.

U.S. Pat. No. 4,802,301 to Isborn et al discloses an enclosure with a small hole to allow access to the bait inside. After the animal lifts the bait two thick jaws with no sharp edges engage the animal's inserted paw.

U.S. Pat. No. 5,862,624 to Askins discloses a collapsible animal trap with a spring biased trigger mechanism.

In the present invention there is a spring trigger on which the bait is placed and a double swivel anchor chain to hold the trap and prevent it from being dragged away, all as will be detailed in the specification that follows hereafter.

SUMMARY OF THE INVENTION

This invention relates to animal trap with a spring trigger on which the bait is placed and a double swivel anchor chain to hold the trap.

It is the primary object of the present invention to provide for an improved animal trap to humanely retrain a caught animal.

Another object is to provide for such a trap in which the trap enclosure has a double twist anchor to prevent the captured animal from dragging away the enclosure.

These and other objects and advantages of the present invention will become apparent to readers from a consideration of the ensuing description and the accompanying drawings.

BRIEF DESCRIPTION OF THE DRAWINGS

FIG. 3 is a perspective view of the trap's top showing the paw receiving opening FIG. 4 is a top view of the invention showing the trap in the set position.

FIG. 5 is a perspective view of a portion of the grip bar.

DESCRIPTION OF THE PREFERRED EMBODIMENT

Figure 1:
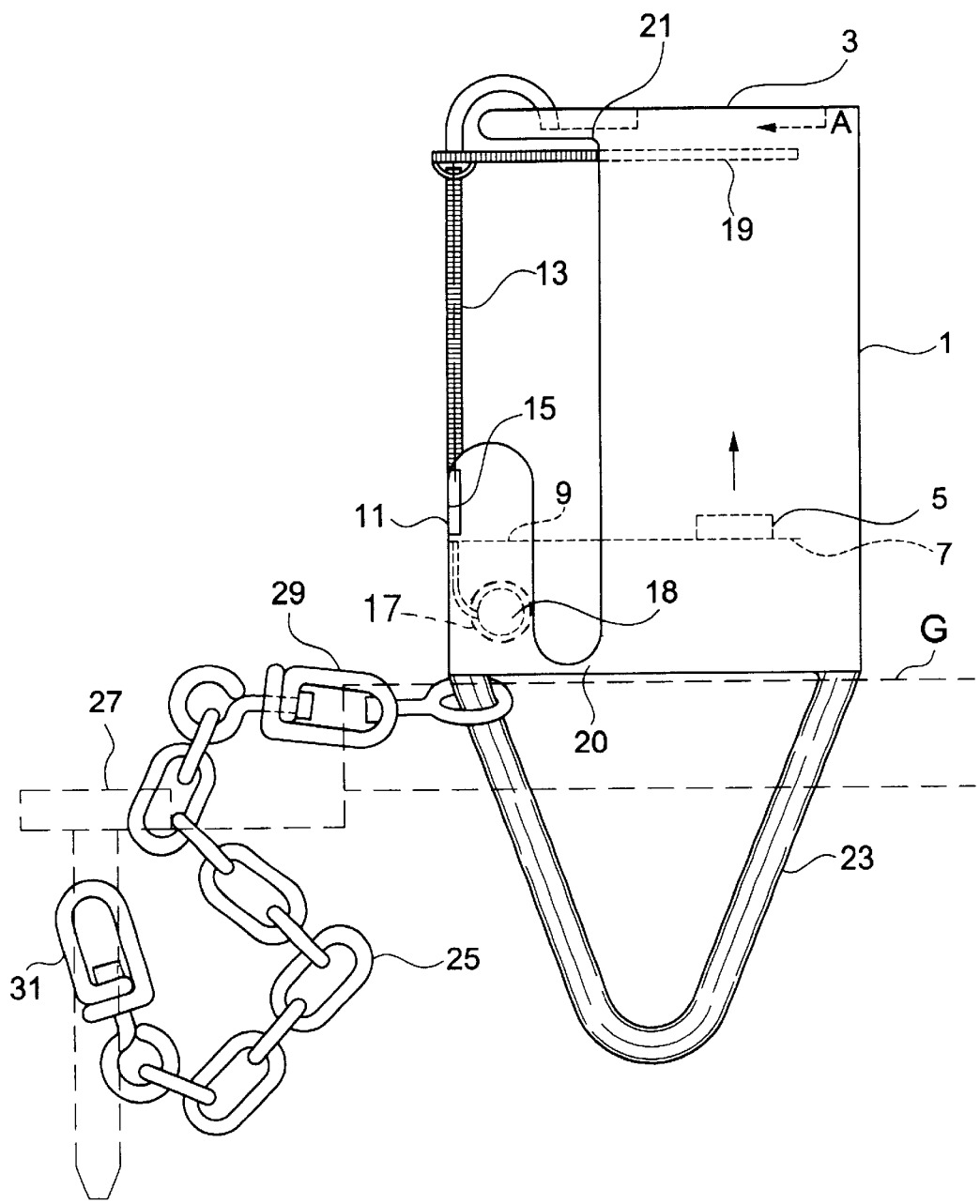
FIG. 1 is a side view of the present invention showing the trap in the set position.

FIG.1 is a side view of the present invention showing the trap in the set position, before a raccoon has placed its paw within the interior of housing 1. The main housing 1 is generally tubular in shape and circular in cross section with an opened top and closed bottom. An opening 3 in the top of the housing permits a raccoon to insert a paw into the interior of the enclosure in order to get the visible bait 5 placed on a trigger arm 7, both of which are shown in dotted line format. The opening 3 in a top surface has a lip that extends downwardly into the housing approximately ¼ of an inch. Trigger arm 7 is mounted on a pivot pin 9 which extends through a section of the arm and the two side mounts 16 which are connected to the housing. As the paw of the raccoon lifts up on the arm 7, the far end 11 of the arm 7 moves and causes a previously restrained trigger to move a vertically disposed latch 13. The lower end 15 of latch 13 is freed from engagement with the end of arm 11.

When this happens, a double legged torsion spring 17, that winds around a lower pivot 18, causes an upper restraint bar 19 to move outwardly, in the direction of the arrow A. The restraint bar 19 has a movealbe U-shaped bight portion directly below the opening 3 which is adapted to engage and enclose the inserted paw of the raccoon. The movement of the restraint bar 19 against the raccoon's inserted paw and up against an internal fixed grip bar 21 in the housing acts to hold or restrain the raccoon. Bar 21 is fixed in place by welding to the inside of housing 1. When so restrained, the raccoon is humanely held without injury.

As shown in FIG. 1, the double legged torsion spring 17, the trigger latch 13, the lower pivot connection for the torsion spring 18 and the pivot 9 for the trigger 7 are outside of the main housing 1. Two spaced upstanding supports 16, only one of ,which is shown the other being directly behind it, act as mounts for the pivot 9, and the wound torsion spring lower end 18. A lower extension 20, to the bottom of housing 1, mounts the two supports 16 to main housing 1.

The restraint bar 19 initially engages the raccoon on the lower part of its inserted front leg. Since the inserted leg of the raccoon is naturally tapered towards its paw end, as the raccoon lifts its front leg it will slide against the restraint bar down to the end of the paw. There the bar reaches the pad area of the raccoon's front paw. When this happens the raccoon will pull against the tough front paw area. This pad area can be held in one of two ways by the present invention. When held by the backside of the raccoon's front paw, the U-shaped part of the restraint bar, and the spring pressure force the creases and projections of the pad area into grooves between the top portion of the restraint and the fixed internal grip bar. The spring pressure also forces portions of the pad area below the internal grip bar to prevent it from pulling out from the housing 1.

When the pad area of the raccoon's front paw is held between the U-shaped part of the restraint bar 19 and the grip bar, spring pressure forces the restraint bar into a crease in the raccoon's front pad area. Spring pressure also forces the backside of the front paw into the restraint bar groove and below the internal grip bar in order to prevent any slippage.

Below the base of housing 1 is an anchor system having an anchor 23 and chain 25 with a double swivel mounted. Initially, the anchor 23 is pushed into the ground G and turned one quarter of a turn to lock the anchor system in place. The anchor 23 consists of a converging lower or pointed lower end, and two upper divergent ends which are fixed to the housing 1. The chain 25, with one of its two ends fastened around part of the anchor 23, has the other end fastened to a stake 27 pounded into the ground. The chain has a double swivel connection 29 at one end. At the other end the chain has a single swivel connection 31 where it is joined to the stake. This arrangement of swivel mounts on the chain 25 prevent the chain from binding against the restraint or stake 27 as the raccoon attempts to pull its paw from the housing 1. In that effort it is anticipated that the anchor 23 will become dislodged from the ground G but the firmly implanted stake 27 will remain in the ground.

To release a raccoon from the housing 1, the torsion spring 17 is simply pushed in the opposite direction of the arrow towards the housing to release the restraint bar 19 and the paw.

When the anchoring system is first pushed into the ground it makes a slot. When turned ¼ of a turn, the anchor displaces the ground below it. When pulled from the ground by a raccoon a new slot is created. Before it is pulled by the raccoon, dogs and other large animals could not knock over the housing. It takes a caught raccoon working the housing to pick up the housing as it pulls it up by force. The stake keeps the raccoon in a set area.

Figure 2:
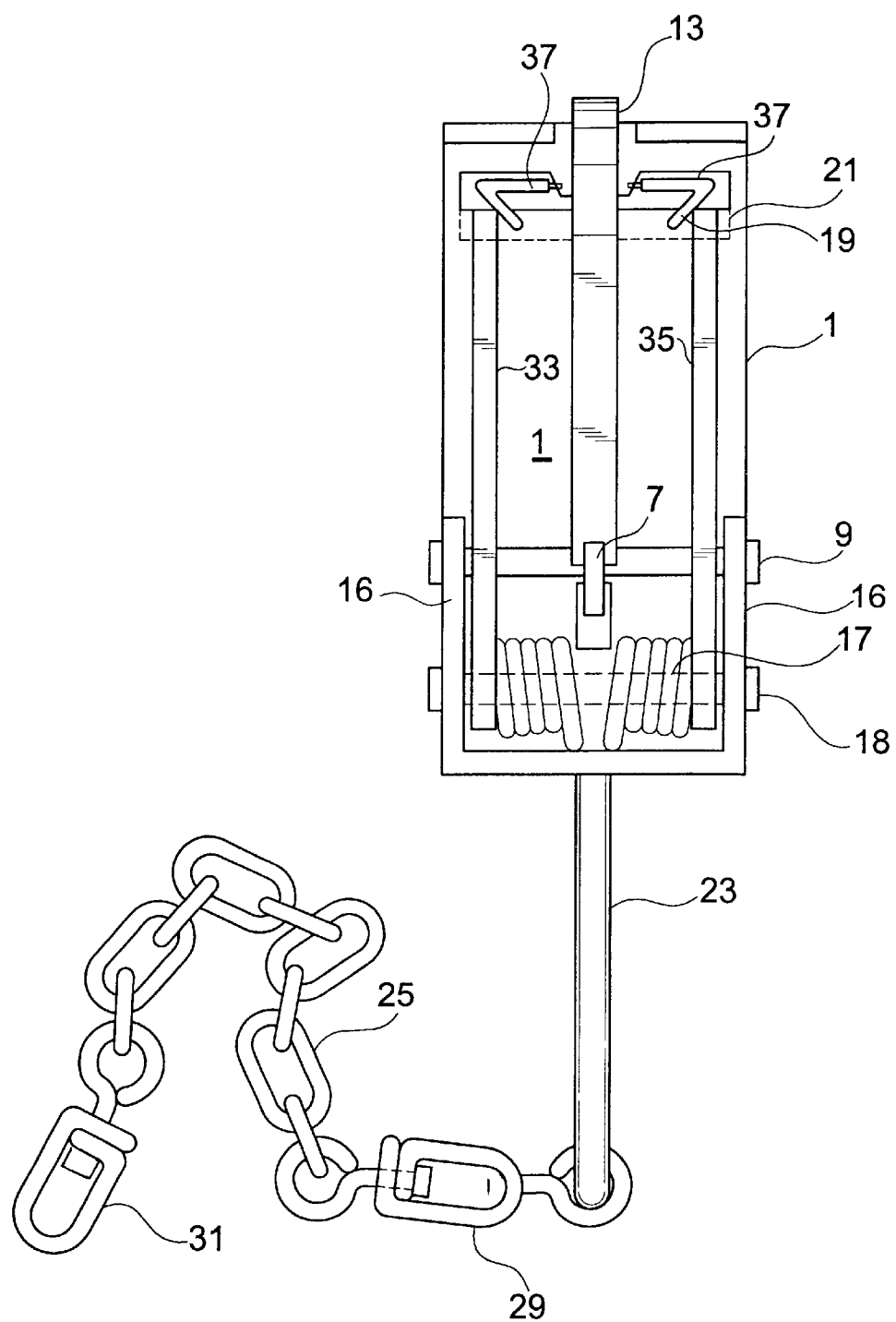
FIG. 2 is a front interior view of the housing shown in FIG. 1.

FIG. 2 is a front interior view of the housing 1 shown in FIG. 1 with the trigger shown in the set position. The ground G and the stake 27 on the end of the chain have been omitted to simplify the figure. At approximately the center of the housing 1 is the vertically disposed trigger latch 13. The latch 13 is attached at its upper end to a square hole in the top surface 39 by a looped end. Surface 39 is also fixed on the top of the main housing 1. On both sides of the latch 13 are the two spaced extension legs 33 and 35 of the double torsion spring 17. The upper free ends of these legs are attached to looped ends in the exposed restraint bar 19. At its lower end the spring 17 is wound around the pivot pin 18. The pin rests on mounts 16 of the extension surface 20 on the lower base of the housing. At the top ends of the spring 17 the two legs each contact separate looped ends of the restraint bar 19, as best shown in FIGS. 3 and 4. Two side spaced slots 37 in the housing 1 act as guides for the restraint bar 19 as it moves in and out of the housing. Behind the upper end of the latch 13, approximately at the center of the top surface 39, is the hole or opening 3. The bait trigger 7 is mounted on the pivot pin 9. The outer free end of trigger 7 moves upwardly when released from its engagement with the lower free end of trigger latch 13. This releasing action occurs when the inserted raccoon's paw bears downwardly on the bait and its holding trigger 7.

FIG. 3 is a perspective view of the top surface 39 of the trap and the opening 3. In this view, shown at approximately a 45 degree angle from vertical, the restraint bar 19 is in a released position before the latch and trigger are set. Visible below the opening 3 is a portion of the grip bar 21. The restraint bar 19 is U-shaped and has its two ends looped around the two upper ends of the double torsion spring 17, while the bight portion of the bar extends through slots 37 into the housing and below the opening 3 of surface 39. The trigger latch 13 is between the spring 17 and has its upper end extending through a square opening in the top surface 39 of the housing. The square opening 38 in the top surface acts to receive the upper looped end of the latch 13 to retain the latch so it can pivot on the surface 39. When inserted, the raccoon's paw is held between the U-shaped portion of the movable restraint bar 19 and the surface of the fixed grip bar 21.

FIG. 4 is a top view of the invention showing the trap in the set position. The trigger latch 13 is shown through opening 3 as engaging the end of the lower bait trigger arm 7 located near the housing base, as in FIG. 1. Normally, the ends of the pivotally mounted trigger arm 7 and the end of latch 13 meet each other at curved end surfaces so that the vertical upward movement of arm 7 releases the engaged latch to move it into a pivotal direction away from the housing. To set the latch, the free lower end is moved towards the housing until it hits the upwardly curved end of the arm 7 where it will be seated until released.

FIG. 5 is a perspective view of a portion of the fixed grip bar 21. This bar is formed of a ³⁄₁₆ inch square rod spot welded inside of the housing 1 below the two restraint bar slots 37, see FIG. 1. Along with the movealbe U-shaped end of the restrain bar 19, bar 21 acts to grip the inserted leg of the raccoon once the trigger has been actuated.

This animal trap was mainly designed to restrain raccoons while preventing dogs and other larger animals from activated it. By selecting the appropriate dimensions for the opening 3, larger animals can not activate the baited end of the trigger. Further, the in ground anchor system, when installed and turned as stated, prevents dogs and larger animals from knocking over the housing 1.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An animal trap comprising:
   a housing that is generally closed with a top opening,
   a biased triggerable restraint member within the housing,
   said restraint member being adapted to engage the extremity of an animal which has been inserted into the housing through the top opening, and
   an anchor system fixed to said housing,
   said anchor system including a first anchor which engages the ground and second anchor remote from said first anchor,
   said first anchor being a twist lock ground engaging anchor having a converging lower end and two upper divergent ends fixed to the housing,
   said anchor system including a double swivel anchor chain mounted to said first anchor at one end and extending to said second anchor at a second end opposite where joined to the first anchor.

2. The animal trap as claimed in claim 1, wherein said triggerable restraint member includes a pivoted arm having a bait receiving portion, said pivot arm being engageable with a trigger latch at a first end, said trigger latch being engageable with the restraint member at a second end, whereby the actuation of said trigger latch causes the release of the restraint member which is spring biased to engage a fixed gripping member fixed to the housing to engage the extremity of the animal.

3. The animal trap as claimed in claim 2, wherein said double swivel anchor chain is mounted to the first anchor adjacent the housing.

4. The animal trap as claimed in claim 3, wherein said double swivel anchor chain has a single swivel mount at the second end where attached to the second anchor.

5. The animal trap as claimed in claim 2, also including a double legged torsion spring used to provide for the spring biased for the restraint member.

* * * * *